(12) United States Patent
Greier et al.

(10) Patent No.: US 7,123,467 B2
(45) Date of Patent: Oct. 17, 2006

(54) ELECTROCERAMIC COMPONENT COMPRISING A PLURALITY OF CONTACT SURFACES

(75) Inventors: Günther Greier, Graz-St. Peter (AT); Günter Engel, Leibnitz (AT); Renate Kofler, Graz (AT); Axel Pecina, St. Peter i. S. (AT); Robert Krumphals, Deutschlandsberg (AT)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 10/490,670

(22) PCT Filed: Sep. 25, 2002

(86) PCT No.: PCT/DE02/03618

§ 371 (c)(1),
(2), (4) Date: Aug. 25, 2004

(87) PCT Pub. No.: WO03/030187

PCT Pub. Date: Apr. 10, 2003

(65) Prior Publication Data

US 2004/0266087 A1    Dec. 30, 2004

(30) Foreign Application Priority Data

Sep. 28, 2001 (DE) .............................. 101 47 898

(51) Int. Cl.
*H01G 4/06* (2006.01)

(52) U.S. Cl. .............. 361/321.2; 361/321.1; 361/321.5; 361/311; 361/313; 361/306.1; 361/306.2

(58) Field of Classification Search ............ 361/306.1, 361/306.3, 321.1, 321.2, 321.5, 311–313, 361/301.1, 301.4
See application file for complete search history.

(56) References Cited

U.S. PATENT DOCUMENTS

| 6,127,040 | A | 10/2000 | Grobbauer | |
|---|---|---|---|---|
| 6,159,768 | A | 12/2000 | Ahn | |
| 6,331,930 | B1 * | 12/2001 | Kuroda et al. | 361/306.3 |
| 6,407,906 | B1 * | 6/2002 | Ahiko et al. | 361/306.1 |
| 6,579,600 | B1 * | 6/2003 | Bowen et al. | 428/198 |
| 6,781,816 | B1 * | 8/2004 | Togashi | 361/306.3 |
| 6,842,329 | B1 * | 1/2005 | Feltz et al. | 361/321.2 |
| 7,050,288 | B1 * | 5/2006 | Ahiko et al. | 361/306.3 |

FOREIGN PATENT DOCUMENTS

| DE | 42 13 629 | 2/1994 |
|---|---|---|
| DE | 196 34 498 | 3/1998 |
| DE | 198 27 574 | 12/1999 |
| DE | 199 46 196 | 4/2001 |
| DE | 101 10 680 | 10/2002 |
| JP | 02189903 | 7/1990 |
| JP | 11150005 | 6/1999 |
| WO | WO02/071825 | 9/2002 |

* cited by examiner

*Primary Examiner*—Nguyen T. Ha
(74) *Attorney, Agent, or Firm*—Fish & Richardson P.C.

(57) ABSTRACT

An electrical component includes a ceramic base body having at least four contact surfaces. Two of the contact surfaces are on opposite sides of the ceramic base body. First protective layers are arranged on regions of the opposite sides of the ceramic base body that do not include the contact surfaces. The first protective layers have a composition that allows the first protective layers to be sintered at a higher temperature than the contact surfaces. Second protective layers are arranged on at least two opposite surfaces of the ceramic base body. The ceramic base body, the first protective layers, and the second protective layers are sintered together.

8 Claims, 5 Drawing Sheets

ELECTROCERAMIC COMPONENT COMPRISING A PLURALITY OF CONTACT SURFACES

BACKGROUND

Many electroceramic components are generally soldered onto platinum in surface mounting. The possibility of surface mounting (SMD ability) can be achieved by attaching the contact surface to the ceramic components. The same applies to the production of wired components. Here too, contact surface must first be applied to the ceramic components. Wires are then attached to these contact surfaces, for example in a soldering process.

Miniaturization of electric components, for example of varistors as protection elements against overvoltages in mobile telephones, requires the production of ever smaller multicomponent elements that have several electrically conducting contact surfaces on their surfaces. Since these components generally have very small dimensions, for example edge length of about 1 mm, the contact surfaces are arranged very close to each other on the surface of the electric component, so it becomes increasing difficult to insulate the contact surfaces from each other electrically. This problem is made more acute by the fact that multilayer contact surfaces are often applied, generally by means of electroplating processes.

The adhesive strength of the electroplated contact surfaces on the ceramic component plays an essential role in this. On an untreated ceramic surface, it is so small, as a rule, that in practice it does not meet the requirements. Therefore, as a rule, a contact base is applied by means of a conducting adhesive or a conducting paste and then enameled. Additional metallic layers can then be deposited onto this contact base by electroplating.

Since some electroceramics, for example varistor ceramics based on zinc oxide, have only a low resistance, a metal layer can be completely or partially deposited onto the ceramic body in such a way that surface leak currents can appear between adjacent contact surfaces. Often, the ceramic bodies are attacked and etched by electroplating baths, which are generally acidic. This can lead, for example in the case of a varistor ceramic, to changing the grain boundaries and thereby to a change in the electric characteristics of the component.

When the electroplating liquid penetrates into the ceramic base body, its electric characteristics can also change so that components that are not overplated between two adjacent contact surfaces have an increased surface leak current.

A process for the production of multicomponent elements is known from patent document U.S. Pat. No. 6,159,768 A, in which a glass paste is applied and enameled onto the sintered ceramic body between adjacent contact surfaces. The disadvantage of this process is that the glass paste and the contact base of the contact surfaces are generally enameled in a similar temperature range at about 800° C., so this can lead to reactions between the glass paste and the conducting paste of the contact base contacting. This reaction can worsen the further deposition of additional contact surfaces by electroplating. Moreover, the reaction between the glass paste and the contact base can lead to increased surface leak currents between adjacent contact surfaces. In addition, in the processes disclosed in the U.S. patent document, only regions between contact surfaces can be provided with the glass paste so that the other regions of the ceramic body that have not provided with a passivation layer can still be etched by the acidic electroplating baths.

In addition, ceramic components are known from patent document DE 196 34 498 C2, on which protective layers of barium titanate, silicon dioxide, aluminum oxide, or glass are arranged. These protective layers have the disadvantage that they cannot be sintered together with the ceramics used for varistors, for example, and it is therefore expensive to produce such components.

SUMMARY

The invention is accordingly based on the task of providing a ceramic component with an improved protective or passivation layer that avoids the disadvantages mentioned.

The task is solved by a component according to claim 1. Advantageous embodiments of the component according to the invention as well as a process for its production are the object of additional claims.

The invention describes an electric component with a ceramic base body that defines the function of the component. On two opposite areas of the base body, at least four contact surfaces are arranged, whereby a first ceramic protective layer is located between the contact surfaces, which is created in such a way that it can be sintered at a higher temperature than the contact surfaces. A second ceramic protective layer is applied to at least two other opposite areas of the ceramic base body. It is thus possible for the second ceramic protective layer to be applied only to two or to all four of the areas that are free of the first protective layer. In order to simplify the component according to the invention, the ceramic base body and the first and second ceramic protective layers can be sintered together. In this way it is possible to burn the whole base body with protective layers arranged on it in one sintering step.

An advantage of the component according to the invention with respect to the state of the art is that the first ceramic protective layer is sintered at higher temperatures than the contact surfaces so that reactions between the contact surfaces and the first ceramic protective layer can be avoided during the sintering of the contact surfaces. Because of this, the component according to the invention with a length of 1 mm and a width of about 1.2 mm has significantly lower leak currents, less than about 3 µA at about 36 V. In traditional components, in which reactions occur between the ceramic protective layers and the contact surfaces, leak currents in the range of about 30 to 300 µA are measured at a voltage of 36 V.

Another advantage of the component according to the invention with respect to the state of the art is that a second ceramic protective layer is applied to at least two additional opposite areas of the ceramic base body. This prevents overplating of the ceramic base body in an advantageous manner, for example when additional metallic layers are applied to the already existing contact surfaces during electroplating.

With the second ceramic protective layer, it is possible to reliably prevent access by the components of the generally acidic electroplating bath to the parts of the surface that it covers. In this way, we can reliably prevent the regions of the ceramic base body covered by the ceramic protective layers from being etched by the electroplating bath.

Surface regions of the ceramic base body that will be removed later from the contact surfaces or other functional regions of the component do not necessarily have to be protected from the acidic electroplating baths. For this reason, it is possible, for example, with a component on which the contact surfaces are arranged on opposite side areas, to coat only the mantle areas with a second ceramic protective layer. The front and back areas of this component can remain free of protective layers (see also FIG. 3D).

In another advantageous embodiment, electrically conducting electrode layers that are separated from each other by parts of the ceramic base body can be arranged in the ceramic base body. Each of the contact surfaces can be connected by several electrically conducting electrode layers and can thus form a stack of electrodes. This embodiment has the advantage that, through a suitable design of the electrically conducting electrode layers, the resistance of the ceramic component can be adjusted flexibly to the planned field of use for each component.

To simplify the production of the component according to the invention, the first and second ceramic protective layers can also be formed advantageously from the same ceramic material. The first and/or second ceramic protective layers have advantageously high resistances. In this way, effective insulation between the contact surfaces can be provided so that short circuits in the protective layers can be avoided. In addition, higher electric resistance of the protective layers has the advantage that depositing metal layers by electroplating onto other areas of the base body than those intended for the contact surfaces can be avoided.

The first and/or second ceramic protective layer(s) can include, for example a lead-lanthanum-zirconium-titanium ceramic (LLZT ceramic) of formula $(Pb,La)(Zr,Ti)O_3$. These involve polycrystalline ceramics with a perovskite structure that is characterized by the general formula $ABO_3$. The A positions can be occupied by Pb in this case, which can be replaced partially by La, in which case the B positions can be occupied by Zr and/or Ti. Advantageously, these ceramics can also contain PbO in an approximate proportion of 50–80 wt %, about 20–50 wt % $ZrO_2$, about 10–40 wt % $Ti_2O_3$, and about 0–20 wt % $LaO_3$.

These ceramics have the advantage that they can be sintered together with many ceramic base bodies. It is also possible to use spinel ceramics of the general formula $AB_2O_4$, where A is a two-valence and B a three- or four-valence metal, for example $ZnMn_2O_4$.

It is also possible to use another perovskite compound of the following general formula:

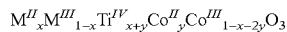

where the two-valence metal, $M^{II}$, is either strontium or barium and the three-valence metal, $M^{III}$, is an element of the rare earths for which the following are true:

$0 \leq x < 0.85$; $0 < y < (1-x)/2$ and $(x+y) \leq 1$.

These materials have the advantage that they can likewise be sintered together with the ceramic base body. In addition, they all have high resistances and do not change the electrical characteristics of the ceramic component during the sintering.

The ceramic base body can include a number of electroceramics, for example a varistor ceramic based on zinc oxide, a capacitor ceramic, or a magnetic ceramic.

In the following, the component according to the invention as well as various processes for producing it will be described in more detail by means of embodiment examples and diagrams.

DETAILED DESCRIPTION

Figure 1:
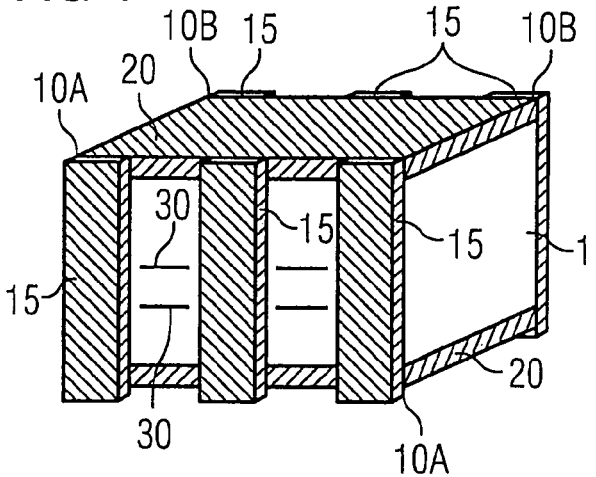
FIG. 1 shows a component according to the invention with first and second ceramic protective layers before application of the contact surfaces, in a perspective view.

FIG. 1 shows a component according to the invention before application of the contact surfaces 5. A first ceramic protective layer 15 can be seen, which covers the regions of the two areas 10A and 10B, which should not be covered by the contact surfaces 5. The second ceramic protective layer 20 is also located on the mantle areas of the component. Electrode layers 30 are arranged in the ceramic base body, two of which are indicated in the diagram.

Figure 2A:
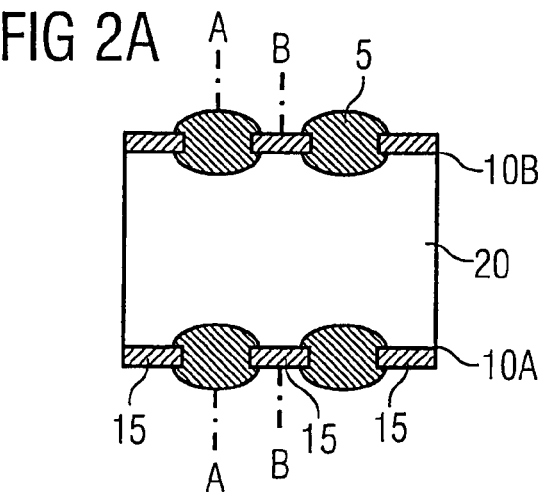
FIG. 2A shows a component according to the invention after application of the contact surfaces, in a top view.

In FIG. 2A, a top view of a component according to the invention can be seen after application of the contact surfaces 5. Two contact surfaces 5 are opposite to each other, where, however, more contact surfaces or pairs of contact surfaces can be arranged. Between the contact surfaces 5, on opposite areas 10A and 10B of the ceramic base body, there is a first ceramic protective layer 15. The mantle areas of the component are each covered by the second ceramic protective layer 20. Two section planes are indicated by A and B, which run through two opposite contact surfaces 5 in the case of A and through two opposite first ceramic protective layers between contact surfaces 5 in the case of B.

Figure 2B:
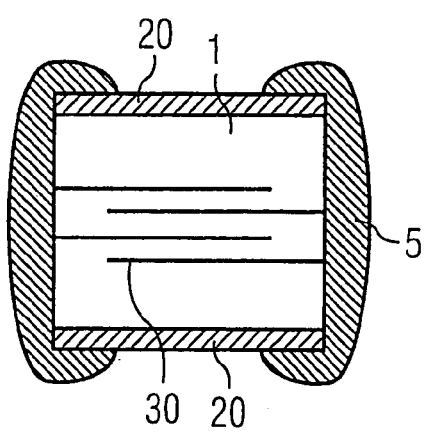
FIG. 2B shows a cross-section through the plane indicated by A in FIG. 2A, between two contact surfaces.

In FIG. 2B, a cross-section through the plane indicated by A in FIG. 2A can be seen. Each contact surface 5 is connected in an electrically conducting manner to electrode layers 30 so that a stack of electrodes is formed in each case. The mantel areas and the areas whose edges are contact with the contact surfaces are covered in this region of the component by the second ceramic protective layer 20.

Figure 2C:
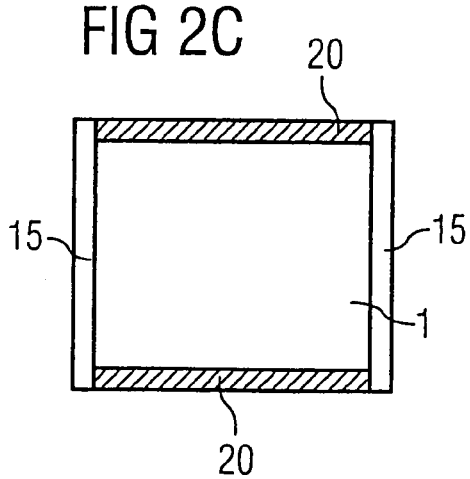
FIG. 2C shows a cross-section through a region between two regions that have been provided with the first protective layer indicated by B in FIG. 2A.

FIG. 2C shows a cross-section through the plane indicated by B in FIG. 2A. It can be seen that in this region the ceramic base body 1 is covered completely by the first ceramic protective layer 15 and the second ceramic protective layer 20.

The component according to the invention can be produced, for example, by means of a two-stage process. In a first process step, A), a first ceramic protective layer 15 is applied to opposite areas 10A and 10B of a base body 1, onto which the contact surfaces 5 will be arranged later, onto which regions not to be covered with the contact surfaces are applied, and onto at least two additional opposite areas 25A and 25B of the ceramic base body a second ceramic protective layer is applied, and then the ceramic base body is sintered. In a second process step, B), the contact surfaces 5 can be created on the ceramic base body between the first ceramic protective layers and sintered at a lower temperature than the protective layer in the first process step, A).

Figure 3A:
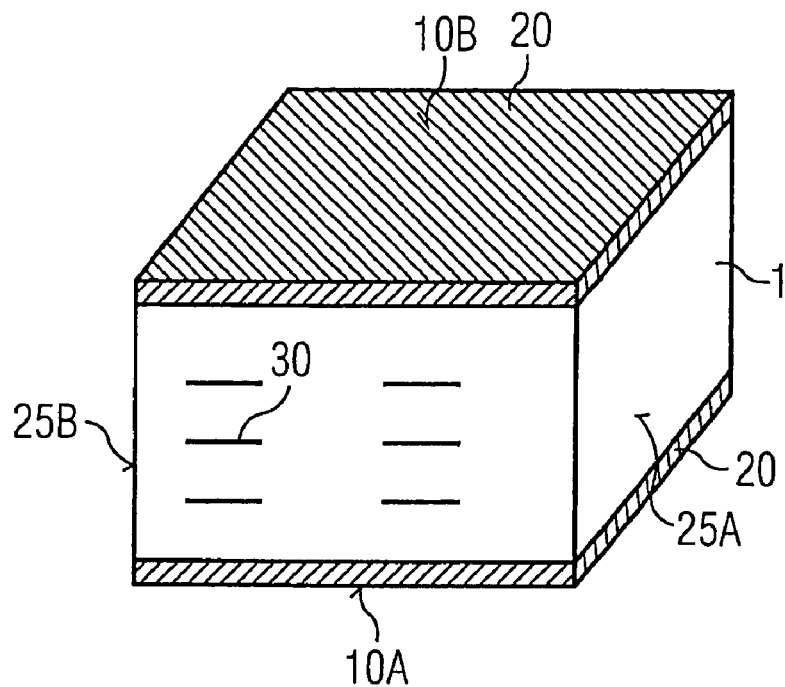
FIGS. 3A through 3D show the production of a component according to the invention, whereby the contact surfaces are applied by means of a conducting adhesive or a conducting paste.

FIG. 3A shows, as an example, the production of a ceramic base body 1 in process step A) by stacking ceramic green tapes, whereby electrically conducting electrode layers 30 can be arranged between the tapes. The electrode layers can be applied, for example, by means of a printing process onto the ceramic green tapes. During the stacking of the ceramic green tapes, the second ceramic protective layer 20 is used advantageously as the top and bottom green tape, as shown in FIG. 3A.

Figure 3B:
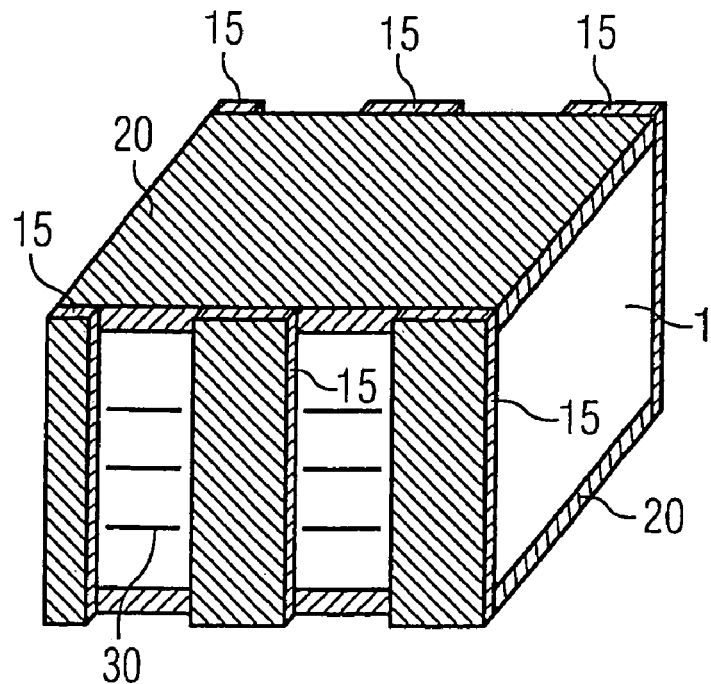
Figure 3C:
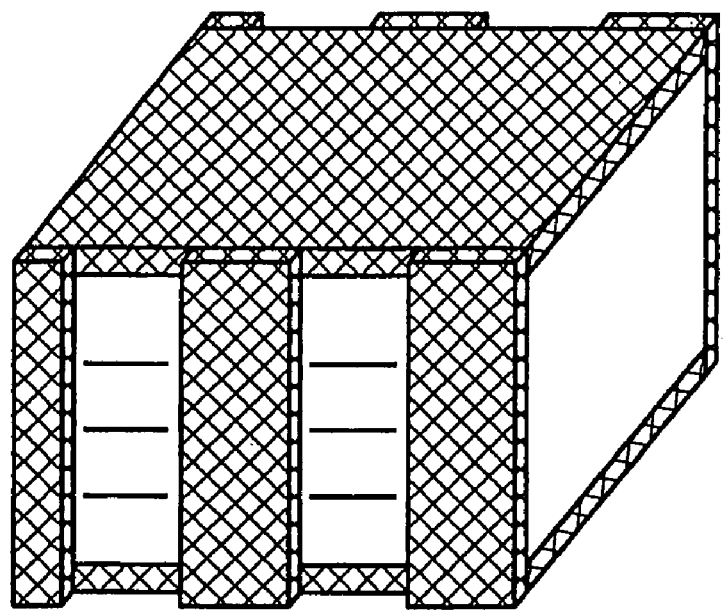

Next, still in process step A), as shown in FIG. 3B, the first ceramic protective layer 15 can be applied to the side areas of the ceramic base body between the regions that are later to be covered by the contact surfaces 5. The first ceramic protective layer can be applied, for example, by means of a printing process, for example a screen-printing process. In this case, it is also possible to cover two opposite areas of the ceramic base body 1 that are not covered by a ceramic protective layer or leave them free of functional regions of the component, if these areas are wide enough, or remove them, like contact surfaces 5 or electrode layers 30, for example. In FIG. 3C, the ceramic base body can be seen with ceramic protective layers on it after the sintering in process step A). The sintering can be accomplished, for example, by heating the ceramic body for about 24 hours at a temperature >1000° C.

Figure 3D:
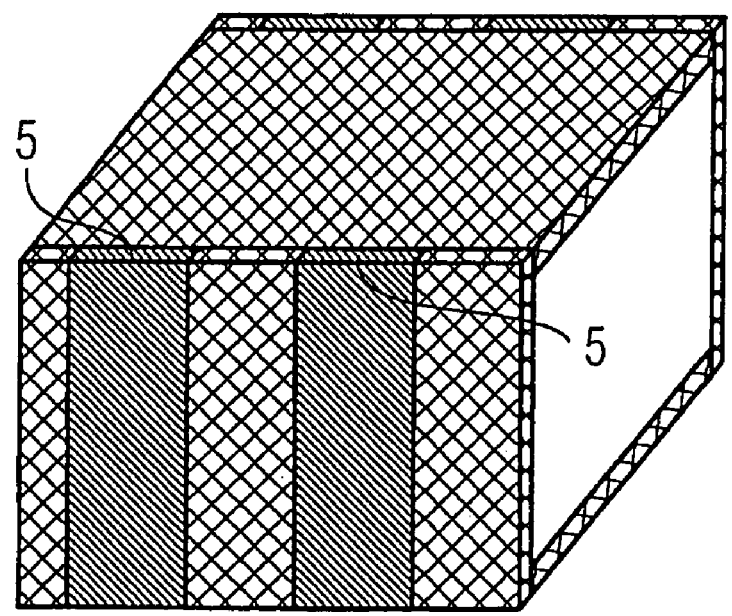

In FIG. 3D, the component according to the invention can be seen after the generation of contact surfaces 5. The contact surfaces can be applied to the ceramic base body, for example, in the form of a conducting paste based on silver, palladium, or platinum, or a conducting adhesive. Then this is enameled at a lower temperature than that at which the sintering took place in process step A). For example, the applied conducting paste is dried at about 200° C. and then enameled for about 1 to 2 hours at about 800° C.

Then, by means of a traditional electroplating step, additional metal layers can be deposited onto the contact surfaces. Thus, for example, a nickel barrier layer and then a tin layer that determines the soldering characterizes of the component, can be applied to the contact surfaces 5.

By means of suitable mechanical and chemical pretreatment of the region provided with the contact surfaces 5, the contact surfaces 5 can also be deposited directly by electroplating onto the ceramic base body. On untreated ceramic surfaces, the adhesive strength of contact surfaces applied by electroplating is normally too low to satisfy the requirements for the component during operation.

Figure 4A:
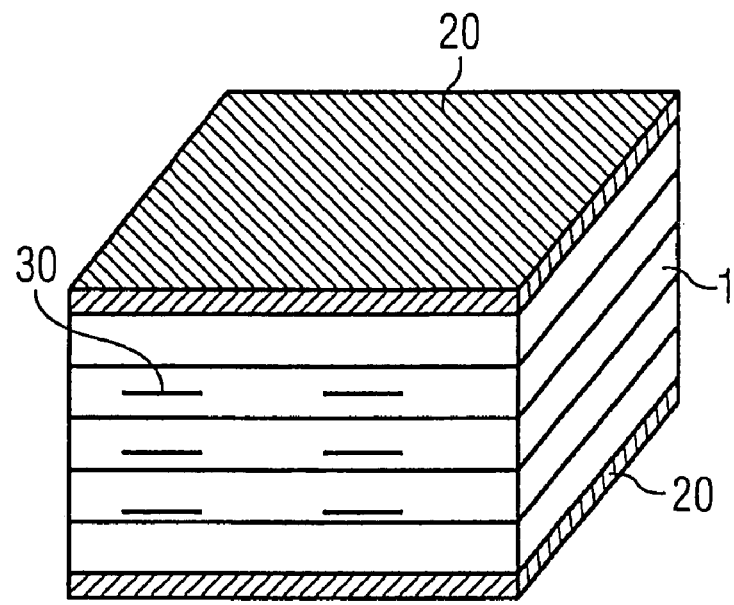
FIGS. 4A through 4D show the production of a component according to the invention, whereby the contact surfaces are applied directly to the ceramic base body by electroplating.
Figure 4B:
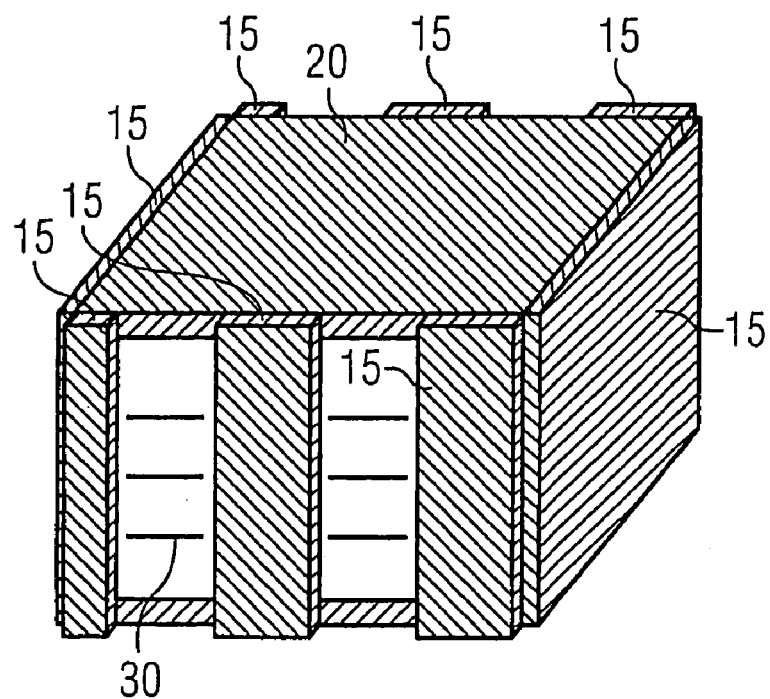

FIG. 4A: Similar to the previously explained process, a first ceramic protective layer is also applied in this process in a process step, A1), to opposite areas of a ceramic base body on which the contact surfaces are to be arranged, on which areas not to be covered with contact surfaces are generated. In order to assure that only the regions of the ceramic base that are to be provided with the contact surfaces are activated chemically and mechanically, a second ceramic protective layer 20 is applied, likewise in process step A), to all four additional opposite areas of the ceramic base body onto which no contact surfaces are to be arranged. In this process, it is thus advantageous to cover all areas not being electroplated with a protective layer. Then, here too in process step A1), the ceramic base body is sintered together with the ceramic protective layers. FIG. 4B shows the component at this stage.

Figure 4C:
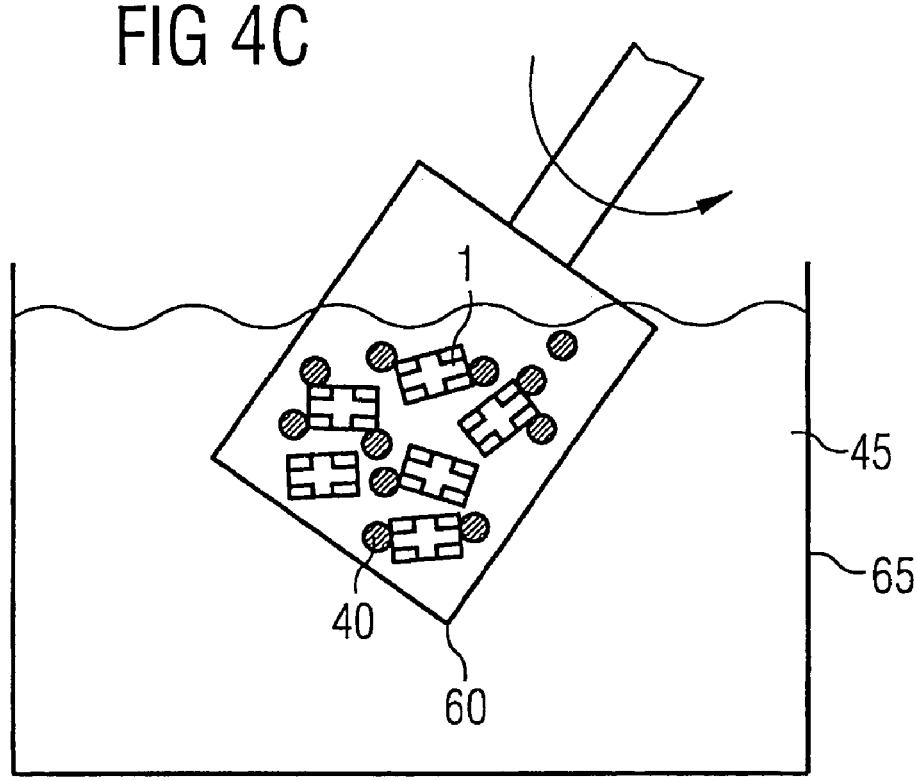

FIG. 4C: then, in a process step, B1), the regions of the ceramic base body to be provided with the contact surfaces are activated by mechanical and chemical treatments. In a subsequent process step, C1), the contact surfaces are then applied directly to the ceramic base body in an electroplating process in the region of the chemically/mechanically activated regions.

Advantageously, the regions of the ceramic base body to be electroplated in process step B1) are treated by mechanical roughening and by chemical etching in acidic or basic aqueous solutions. The roughening can be performed, for example, by means of grinding bodies acting on the regions of the component to be electroplated. Small balls or even cubes of silicon carbide, carborundum, or steel can be used, for example, as grinding bodies. Process step B1) can be performed advantageously by means of a rolling motion of a set of ceramic components and grinding bodies in an acidic aqueous medium in a rotating drum. By means of simultaneous mechanical roughening and chemical etching, the surfaces of the ceramic component can be modified reliably in such a way that good adhesive strength of the contact surfaces on the ceramic component can be provided during the electroplating process in process step C1).

Figure 4D:
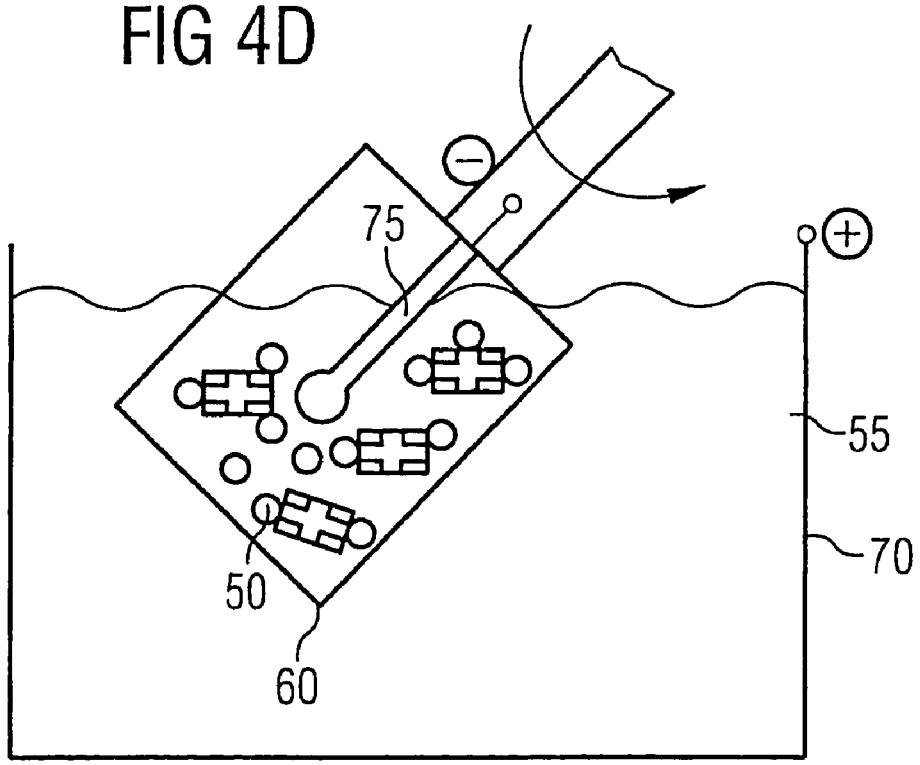

FIG. 4D: The electroplating in process step B1) takes place advantageously on a batch so that a large number of ceramic components can be pre-treated chemically and mechanically in one step in a simple and cost-favorable manner.

In process step C1), contact surfaces are deposited by electroplating onto the regions of the component that were roughened and etched in process step B1). The electroplating in this case takes place advantageously in a batch, like process step B1), whereby the components are combined with contact bodies in an acidic metal-salt solution. The contact bodies are electrically advantageous conducting metal balls, for example steel balls that contact the components and provide a better current flow between the components so that a higher rate of deposition of the metal (contact surfaces) onto the components can be achieved. As a rule, the mixture of components and contact bodies is in a rotating drum in an electrolyte solution here too, in which case the drum is located in an electroplating basin. By applying a suitable current (wiring the electroplating basin as the anode and immersing a cathode in the rotating drum), a contact surface can be electroplated onto the regions of the component that have been pretreated according to process step B1).

In FIG. 4A, the production of the ceramic base body 1 can be seen, which takes place in a manner similar to the first process presented above. The base body can be produced, for example, by stacking green tapes, whereby electrode layers can be arranged between the green tapes and the top and bottom tapes each comprise the second ceramic protective layer. In contrast to the first process presented, however, in this process in process step A1) all regions of the ceramic base body that are not to be covered with a ceramic protective layer by electroplating, in order to protect these regions from the effect of the chemical bath and the grinding bodies in process step B1). The first ceramic protective layer, as well as the remaining ceramic protective layers, all of which cover regions of the component that are not to be electroplated, can again be applied, for example, by means of a printing process, such as screen printing. In FIG. 4B, a ceramic base body with first and second ceramic protective layers is shown before sintering.

After the sintering of the ceramic base body, which takes place, for example, for 24 hours at peak temperatures >1000° C., the regions to be electroplated can be pre-treated mechanically and chemically in process step B1), as shown in FIG. 4C. For this, the ceramic components are brought into contact with grinding elements 40 in an acidic aqueous solution. The mixture of grinding bodies and ceramic components is in a rotating drum 60 that is immersed in an acid bath 45 in a basin 65. The rotary motion of the drum is represented in FIG. 4C by an arrow. The axis of rotation of the drum is inclined in order to provide a rolling motion of the mixture of ceramic components and grinding bodies. Through the simultaneous mechanical roughening by the grinding bodies 40 and chemical etching in the acidic bath 45, the regions of the components to be electroplated are modified in such a way that a reliable adhesion of the contact surfaces applied by electroplating in C1) is possible. As the acid bath, an aqueous solution with a pH value of about 1.0 to 1.5 is used, for example. The size of the contacting surfaces and the probability of contact between the grinding bodies and the components are increased by maintaining an advantageous ratio of component length to grinding-body diameters. This is advantageously about 1:0.05 to 1:0.8.

In process step C1), the ceramic components that have been pre-treated according to B1) are likewise electroplated in a batch, as shown in FIG. 4D. For this, a quantity of components and contact bodies 50 are placed in a rotating drum 60. This drum is immersed in an electrolyte solution 55, which is located in an electroplating basin 70. The electrolyte solution consists, for example, of a tin-salt solution with an approximate concentration of 10 to 20 g $Sn^{II}$ per liter, whereby the pH value is approximately 3 to 4.5. Electrically conducting balls, for example steel balls, are used advantageously as the contact bodies. In order to make it possible to deposit metallic contact surfaces onto the regions of the components to be electroplated, the electroplating basin 70 is wired as the anode and simultaneously an electrode 75 is immersed in the rotating drum 60 that is wired as the cathode. The rolling motion of the drum 60 makes good contact between the components and the contact bodies possible, whereby in this process a ratio of component length to contact-body diameter of about 1:0.05 to 1:0.08 is maintained. In this way, the probability of contact between the contact bodies and the components is increased so that, because of the good current flow, good deposition of metal onto the regions to be electroplated is possible. The current densities in this case are advantageously in the range from about 0.5 to 0.15 $A/dm^2$.

Advantageously, the contact bodies used in C1) are simultaneously used as grinding bodies in process step B1). This makes possible a simple and continuous process, in which, after process step B1), the rotating drum is removed from the acid bath 45 and washed a few times with water in order leave no contamination from the acid bath on the components or contact bodies and/or grinding bodies in process step C1). After washing, the component-contact mixture can be immersed directly in the electroplating bath with an electrolyte solution 55, and process step C1) can be performed. In this way, additional expensive work steps, such as, for example removing the grinding bodes during the transition from process step B1) to C1) can be avoided.

The advantages of this process also include the fact that both the pretreatment of the regions to be electroplated in process step B1) and also process step C1) can both be performed with the same technical devices provided for the electroplating.

The component according to the invention is not limited to the embodiment examples present here. Other variants regarding both the number of contact surfaces and the composition of the first and second ceramic protective layers, as well as regarding the production processes for components according to the invention are possible.

The invention claimed is:

1. An electrical component comprising:
    a ceramic base body having at least four contact surfaces, two of the contact surfaces being on opposite sides of the ceramic base body;
    first protective layers on regions of the sides of the ceramic base body that do not include the contact surfaces, the first protective layers having a composition that allows the first protective layers to be sintered at a higher temperature than the contact surfaces; and
    second protective layers on at least two opposite surfaces of the ceramic base body;
    wherein the ceramic base body, the first protective layers, and the second protective layers are sintered together.

2. The electrical component of claim 1, wherein the second protective layers are on all four of the contact surfaces and on areas of the ceramic base body that do not include the first protective layers.

3. The electrical component of claim 1, further comprising:
    electrically conducting electrode layers in the ceramic base body, the electrode layers being separated from each other by regions of the ceramic base body;
    wherein each of the contact surfaces is connected to several electrode layers.

4. The electrical component of claim 1, wherein the first and second protective layers are formed from a same ceramic material.

5. The electrical component of claim 1, wherein the ceramic base body includes a varistor ceramic, a capacitor ceramic, or a magnetic ceramic.

6. The electrical component of claim 1, wherein at least one of the first and second protective layers has a resistance that is high enough to provide insulation between at least two contact surfaces.

7. The electrical component of claim 1, wherein at least one of the first and second protective layers comprises a spinel ceramic with composition $AB_2O_4$, where A is a two-valence and B is a three- or four-valence metal or a perovskite having the following general formula:

$$M^{II}_x M^{III}_{1-x} Ti^{IV}_{x+y} Co^{II}_y Co^{III}_{1-x-2y} O_3;$$

wherein $M^{II}$ is either strontium or barium and $M^{III}$ is a rare earth element; and
wherein:

$$0 \leq x < 0.85; \; 0 < y < (1-x)/2 \text{ and } x+y \leq 1.$$

8. The electrical component of claim 1, wherein at least one of the first protective layers and the second protective layers includes a lead-lanthanum-zirconium-titanate ceramic $(Pb,La)(Zr,Ti)O_3$.

* * * * *